United States Patent [19]

Tabib et al.

[11] Patent Number: 5,530,436
[45] Date of Patent: Jun. 25, 1996

[54] METHOD OF COMMUNICATIONS BETWEEN MASTER UNIT AND SLAVE UNIT WITH EFFICIENT PROTOCOL

[75] Inventors: Itzhak Tabib, Petach-Tikya; Uzi Zakai, Reuth; Haim Geller, Nili, all of Israel

[73] Assignee: Motorola, Inc., Schaumburg, Ill.

[21] Appl. No.: 260,636

[22] Filed: Jun. 16, 1994

[30] Foreign Application Priority Data

Jun. 26, 1993 [GB] United Kingdom ............... 9313259

[51] Int. Cl.⁶ ........................................... H04J 3/24
[52] U.S. Cl. ........................ 340/825.07; 340/825.52; 370/79; 370/82
[58] Field of Search .................. 370/92, 94.1, 79, 370/82; 340/825.06, 825.07, 825.52

[56] References Cited

U.S. PATENT DOCUMENTS 4,251,880  2/1981  Baugh et al. ................... 370/79
4,860,003  8/1989  DeLuca et al. ................. 340/825.52
5,163,047  11/1992 Perdikaris et al. .............. 370/94.1

Primary Examiner—Michael Horabik
Attorney, Agent, or Firm—Wayne J. Egan

[57] ABSTRACT

A method of communications between a master unit and a slave unit of a supervisory control and data acquisition system is provided. The communications protocol has at least two bytes of data where the first byte (100) is an address byte containing address information for addressing the slave unit and the second byte (101) is a control byte containing an expansion bit and two address/type variable bits to be interpreted by the slave according to a rule set. In the rule set, the meaning of certain control bits (107) is related to the state of an expansion bit (103). The expanion bit defines the presence or absence of a third byte (102).

6 Claims, 4 Drawing Sheets

*FIG.8*
*FIG.9*
TYPE – OPEN
BY TIME
FIRST OUTPUT
SECOND OUTPUT
*FIG.11*
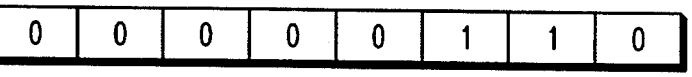
*FIG.12*
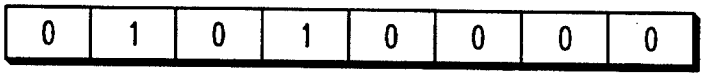

FIG.10

| 0 | 0 | 1 | 0 | 1 | 0 | 0 | 0 | TYPE IS 2 (INPUT) HNDL 1 INPUT |
|---|---|---|---|---|---|---|---|---|
| 0 | 0 | 0 | 0 | 0 | 0 | 1 | 1 | INPUT NR. |
| 0 | 0 | 1 | 1 | 0 | 0 | 1 | 1 | INPUT CONTROL DOWNLOAD FLOW, PULS |
| 0 | 0 | 0 | 0 | 0 | 0 | 0 | 0 | PULS COUNT |
| 0 | 0 | 0 | 1 | 0 | 1 | 0 | 0 | (14 HEX) |
| X | X | X | X | X | X | X | X | HIGH FLOW N |
| X | X | X | X | X | X | X | X | HIGH FLOW T |
| X | X | X | X | X | X | X | X | LOW FLOW N |
| X | X | X | X | X | X | X | X | LOW FLOW T |
| X | X | X | X | X | X | X | X | TIME + PULSES |

5,530,436

1

METHOD OF COMMUNICATIONS BETWEEN MASTER UNIT AND SLAVE UNIT WITH EFFICIENT PROTOCOL

FIELD OF THE INVENTION

This invention relates to a method of communications between a master unit and a slave unit of a supervisory control and data acquisition (SCADA) system. Such a system may, for example, be used for controlling irrigation systems, power distribution systems, building control systems and the like.

BACKGROUND TO THE INVENTION

SCADA systems, such as Motorola's INTRAC and MOSCAD systems provide remote control of a remote terminal unit (RTU) from a central unit over a radio link. The RTU may directly control the system which is being supervised and controlled, for example an irrigation system, by direct connection between the RTU and relays, sensors and other elements of the system under control.

For greater capacity, the RTU can supervise and control the system via one or more terminal units. A number of terminal units can be connected to a single RTU. Each terminal unit can control a number of elements or receive data from a number of elements. Thus there is greater pan-out between the RTU and the elements of the system being supervised and controlled.

A serial radio communications link can be provided between the RTU and the terminal units and there is a need for an efficient protocol on this link. In such an arrangement, the RTU is a "master" and the terminal unit is a "slave".

There is a need for an efficient protocol for communication between the master and the slave.

In serial protocols, it is common to provide a first byte containing address information and a second byte containing control information. It is also common for one of the bits of the control byte to be an expansion bit indicating the presence or absence of a third byte for an expansion address. Thus, in an 8-bit arrangement, 2 bytes can be used to address 256 addresses and by using a third byte when required, up to 64 K of addresses can be accommodated. Such an arrangement can be efficient in only using 2 bytes when possible and only expanding to a third byte when necessary.

On the other hand, in a system that typically requires, say, 1,000 addresses, the aforementioned arrangement does not provide any significant efficiency, because the third byte would almost always be required, yet would not always be fully utilised. Merely using some of the bits of the second byte as address bits reduces the amount of control information available. This last arrangement is inadequate.

There is a need for an improved serial communications protocol.

According to the present invention, a method of communications between a master unit and a slave unit of a supervisory control and data acquisition system is provided comprising the steps of sending at least two bytes of data from the master unit to the slave unit, where the first byte is an address byte containing address information for addressing the slave unit and the second byte is a control byte containing an expansion bit and two address/type variable bits to be interpreted by the slave according to a rule set. The rule set is as follows: if an expansion bit of the control byte is set, then a third byte is to be expected containing address information for addressing the slave unit and the two vari-

2 able bits contain type information; whereas if the expansion bit is not set, then no third byte is to be expected and the variable bits contain address information; and if the variable bits are type information then a first state of these bits indicates a broadcast message and a second state indicates a different message. The method further comprises the step of receiving the at least two bytes of data, decoding these bytes, applying the rule set, receiving the third byte if required by the rule set, comparing the address information in the first byte and, selectively, the variable bits and the third byte as required by the rule set with the address of the slave.

In a preferred embodiment, the first byte comprises 8 bits of slave address and the second byte comprises 1 expansion bit, 2 variable address/type bits and 5 control bits. In this manner, 1,000 slave addresses can be accommodated without extending to a third byte. At the same time, if the protocol is expanded to the third byte, 2 of the bits which have been used for address bits in the second byte can now be used for control information. In particular, these bytes can indicate that the message type is a broadcast message. At the same time, even if the third byte is not used, control information representing that the message is a broadcast type need not be lost, because a broadcast type of call can be indicated by providing a system address in the first byte.

Thus, a particularly efficient protocol is provided which accommodates a large number of slave addresses without frequently reverting to a third byte and yet maintains the ability to indicate a broadcast type of call without further use of the valuable remaining bits of the second (control) byte.

BRIEF DESCRIPTION OF THE DRAWINGS

FIGS. 7 to 10 show bytes in a third example of the protocol sent by the master unit to the slave unit.

FIGS. 11 and 12 show examples of acknowledgement bytes from the slave unit to the master unit.

DETAILED DESCRIPTION OF THE PREFERRED EMBODIMENT

Figure 1:
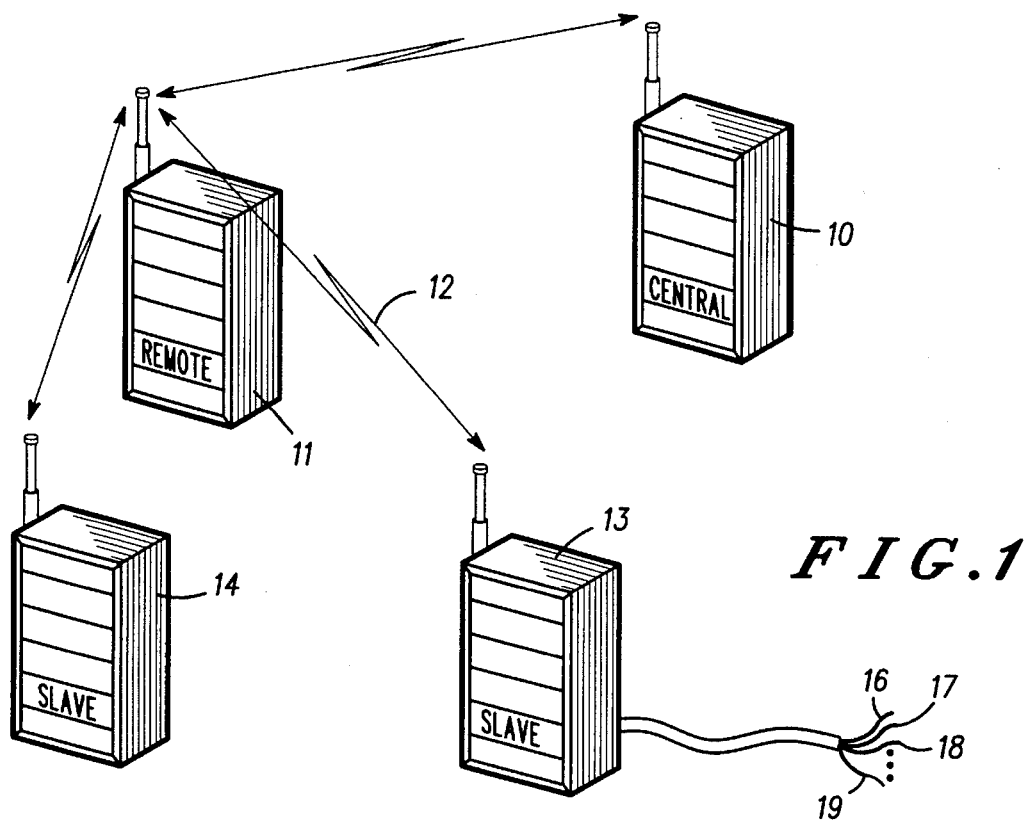
FIG. 1 shows an overall block diagram of an SCADA system incorporating the invention.

Referring to FIG. 1, there is shown a central unit 10 and a remote terminal unit (RTU 11) of a SCADA system. These units communicate over a radio interface. Communicating with the RTU 11 over a further radio interface 12 is a slave unit 13. Further slave units such as unit 14 can communicate with RTU 11. Further input/output devices can also be connected to RTU 11 (not shown). Slave unit 13 communicates to elements of a system being controlled by the SCADA system. These are represented by inputs/outputs 16, 17, 18 and 19.

Inputs and outputs 16–19 can supervise the system under control and acquire data from that system, for example acquiring data relating to water levels, temperature, flow rates etc., or they can control that system, for example controlling valves, pumps, heaters, etc.

UK patent application publication No. 2257549 describes an RTU 11 and input/output devices for that RTU for direct supervision and control of another system.

Figure 2:
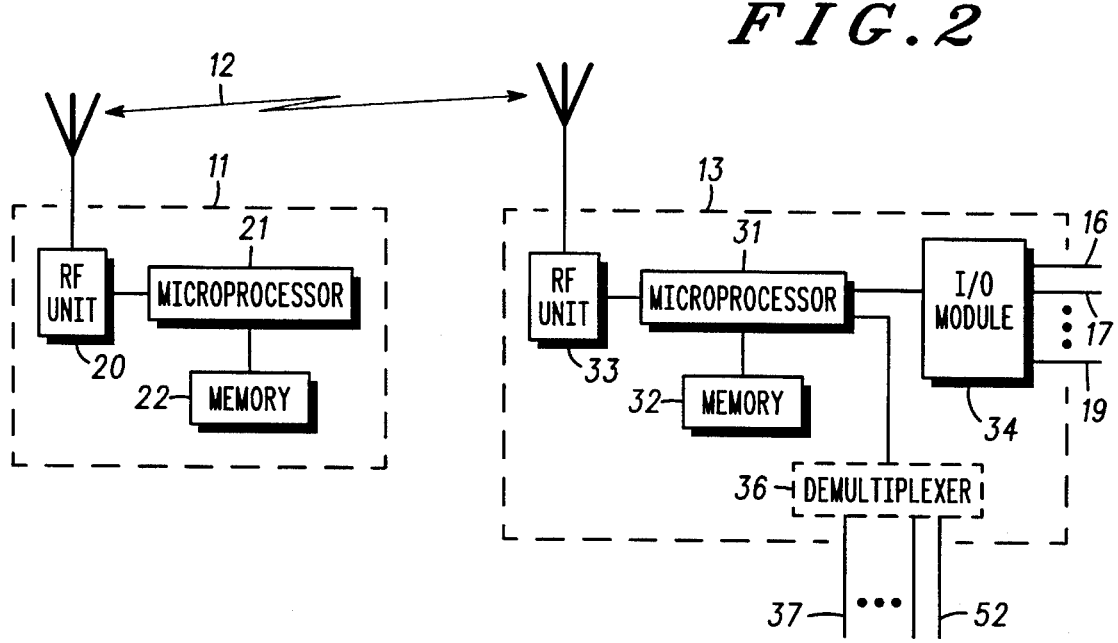
FIG. 2 shows a master unit and a slave unit of the system of FIG. 1.

Referring to FIG. 2 the RTU 11 is shown in greater detail, as is the slave unit 13. The RTU 11 comprises an RF unit 20, a microprocessor 21 and memory 22.

The slave unit 13 also comprises a microprocessor 31 and memory 32 and an RF unit 33. In addition, there is shown an I/O module 34 coupled to the microprocessor 31 over a parallel data boss 35. The I/O module 34 communicates over input/output lines 16–19.

As an alternative to I/O module 34, is shown in phantom outline a simple 16-way demultiplexer 36 having up to 16 inputs and outputs 37–52.

In at least its first aspect, the present invention is primarily directed at communication between the slave unit 13 and the RTU 11 over the RF link 12.

The microprocessor 21 selects a slave unit 13 or 14 for addressing. In the case of addressing of the slave unit 13, the microprocessor 21 compiles a 2-byte or 3-byte word containing the address of unit 13 and containing certain control information described below. This packet is transmitted through RF unit 20 over radio link 12 and is received at RF unit 33 and decoded by microprocessor 31. Microprocessor 31 extracts the address from this word and compares it with the address of unit 13 to ascertain whether unit 13 is being addressed. If unit 13 is indeed being addressed, that unit receives and decodes the rest of the incoming packet of data over link 12 and responds thereto. If unit 13 is not being addressed, the unit disregards the rest of the incoming packet and awaits the next packet. The address of unit 13 is stored in memory 32.

Figure 3:
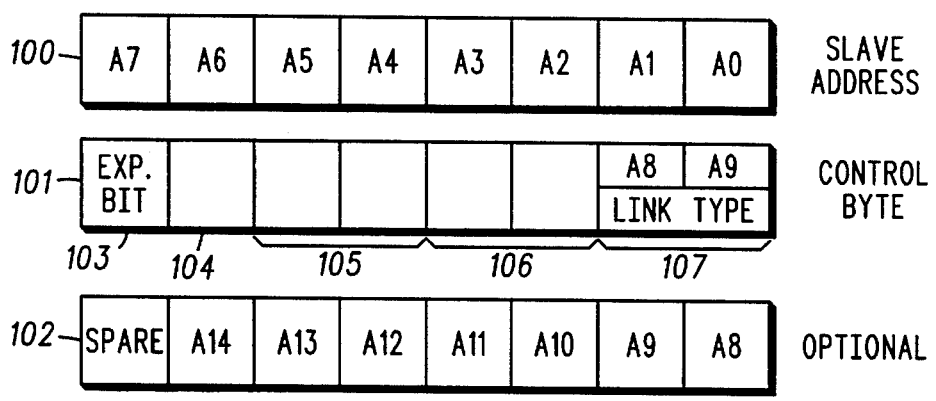
FIG. 3 shows three link layer bytes of a serial communications protocol used between the master and slave units of FIG. 2.

FIG. 3 shows the link layer word of the incoming packet of data over the link 12. This word comprises first and second bytes 100, 101 and an optional third byte 102. Each of these bytes comprises 8 bits. The first bytes comprises 8 address bits. If all these address bits are set to a predetermined address, for example, 00000000, this indicates a "set call", that is to say a broadcast message to all slave units. 00000000 is called the "system address".

The first bit of byte 101, labelled 103, is the expansion bit. If this bit is set to 1, this indicates that optional byte 102 is present. If expansion bit 103 is set to 0, this indicates that the first and second bytes form the complete link layer word.

The second bit 104 of the second byte 101 indicates whether the packet is originating or is in reply to a previous communication. (1=originate, 0=answer).

The third and fourth bits of byte 101 are labelled 105 and having the following meanings. If bit 104=1, bits 105 contain the answer time slice. Otherwise these bits contain 00.

The fifth and sixth bits are labelled 106 and are the frame sequence indicators.

The meaning of the seventh and eighth bits 107 is dependent on the expansion bit as follows. If the expansion bit=0, then bits 107 are address bits A8 and A9 of the slave. Otherwise (exp=1), these bits contain the "link type". This is explained below.

It is to be noted that even when the expansion bit is set to 0, there are ten address bits available. If the expansion is set to 1, there are sixteen address bits available (although only 15 are used—the first bit of the third byte is spare). If the third byte is included, bits 107 serve a function other than an address function. They in effect serve a control function as follows.

The link type bits 107 have the following meaning: 00="cannot be used", 01="set call" (i.e. broadcast frame); 10 and 11=other uses.

The following further rules apply. If exp=1 and link type=set call, then A0–A14 are the system address. In this case, frame sequence=00, answer time slice=00 and originate=1.

The answer time slice function allows sending of four frames together to four different destinations and receipt of answers from all those four destinations without collision.

A particularly preferred feature is that the slave address byte 100 occurs first. This allows fast rejection of the frame received.

Following the link layer, there occur further layers. The next immediate layer is the application layer in which there is first transmitted a type indicator in a single byte of eight bits.

Figure 4:
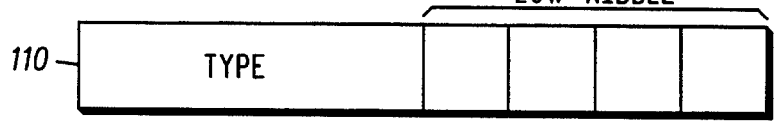
FIG. 4 shows a first byte of an application layer of the protocol of FIG. 3.

The type indicator can take the following values:
0= output to close
1= outputs open by time
2= inputs
3= database (download request)
4= database (upload requests)
5= diagnostic
6, 7, 8= further types This application layer byte is shown in FIG. 4. The first four bits shall be referred to as the "low nibble" and the fifth to eight bits are the type indicator as described above.

Figure 5:
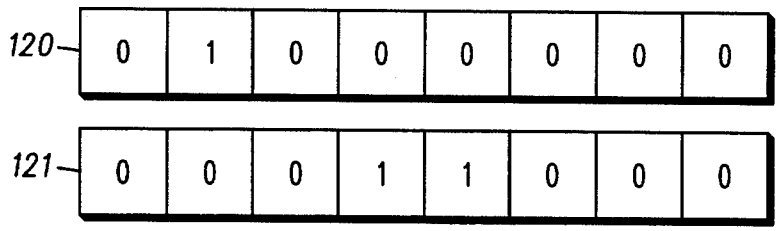
FIG. 5 shows a first example of two further bytes of the application layer of the protocol sent by the master unit to the slave unit.

In type 0, if the low nibble of the type byte is not equal to zero, the low nibble is the output number to be closed. Otherwise the next two bytes indicate the outputs to be closed. This is illustrated in FIG. 5. In this figure, bytes 120 and 121 indicated that valves 4, 5 and 15 are to be closed. This is indicated by the "ones" appearing in the fourth, fifth and fifteenth positions.

To summarise type 0, when the low nibble is zero, this type indicates a one-to-one relationship between bits in the immediately following two bytes and valves or other outputs to be activated.

In type 1, the low nibble of byte 110 indicates the total number less 1 of valves to be opened, and for every valve to be opened, there follows two bytes of the type 122 and 123. In byte 122, the first four bits 124 indicates the valve number less 1 of the valve to which the two bytes apply. The high nibble 125 and the second byte 123 together indicate the time in 8 second resolution for the opening of the valve. There may be up to sixteen pairs of bytes 122 and 123.

The following describes the remaining types 2, 3, 4 and 5.

Type 2

Low Nibble:

bit b3          stands for master/slave
  bits b0–b2     stands for nr. of inputs (0–7 ===> 1–8)
each input has "input nr" byte & "control" byte.
Control byte:

| | if master | if slave |
|---|---|---|
| b0: | stability enable/disable | upload stability state |
| b1: | unopen enable/disable | unopen meter |
| b2: | upload pulses | upload pulses count |
| b3: | upload flow | upload flow |
| b4: | download pulses count | |

-continued

```
b5:         download high & low flow
b6:         download input parameters
After control byte follows the proper data due to the bits set
in the control byte:
        pulses      count           2 bytes
        high/low    flow            5 bytes (n,t; n,t) &
                                    start flow check pulses/time
        input parameters            stability time (2 bytes)
                                    unopen time (2 bytes)
                                        Type 3
```

Data Base Remarks:

```
    4.1:    z           table number
            y           row
            x           column
    4.2:    assumption: till 200 columns in all of the units.
                        x:  0-200 is column
                            201-255 is action
```

Low nibble:

```
        case 0:     X1, y1, val1, . . . xn,yn,valn
        case 1:     (row fill)
                    z,y,val1, . . . ,valn
        case 2:     (column fill)
                    x,val1, . . . ,valn
                        Type 4
```

Low nibble:

```
        case 0:     x1,y1, . . . ,xn,yn
        case 1:     z,y
        case 2:     x
```

Type 5 Diagnostic type

Low nibble stands for number of diagnostic requests.
Low nibble:
case 0; this is null word (used for adding 1 byte to protocol
to prevent collision with INTRAC frame)
else; number of diagnostic requests (see definitions at end
of this file)

Following the application layer information, there is a check code (CRC). If the total flame length is less than or equal to sixteen, then there is a single CRC byte. If the total flame length is greater than sixteen, then there are two CRC bytes. Thus, additional error correcting capacity is provided to accommodated different lengths of flame. This maintains the robustness of the error correcting even for longer frames, without using unnecessary capacity on the link in the case of short frames.

There now follow some examples of protocols.

Example 1

Consider the case where the master wishes to command the slave (address 712) to do the following:

(a) close outputs 2, 8, 10; (b) open output 4 for 24 minutes and output 9 for 184 minutes; (c) download input data from input 3 "high flow, low flow and count twenty pulses".

Figure 7:
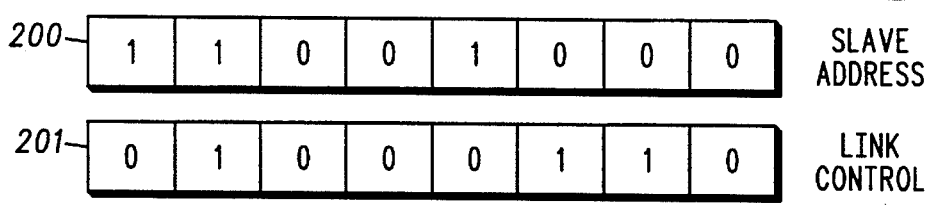

For this instruction, the link layer bytes are shown in FIG. 7 and the first three application layers bytes are shown in FIG. 8.

Referring to FIG. 7, the first byte 200 gives the slave address 11001000 (712) and the second bytes 201 gives the link control information which is: originate; answer time slice 0; frame sequence 1.

Figure 6:
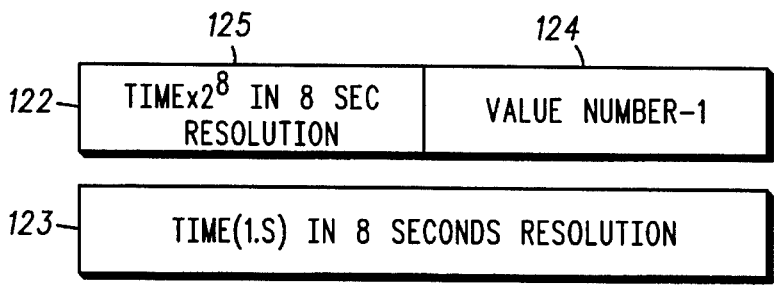
FIG. 6 shows a second example of the bytes of FIG. 5.

Referring to the application layer in FIG. 8, the first byte 203 indicates that the type is "closed" and that the next two bytes 204, 205 indicate the valves to be closed. These bytes 204 and 205 refer to valves 3, 8 and 10. Following the application layer are the bytes of FIG. 9. The first byte 204 indicates that the type is "open by time" and that the immediately following bytes are of the format shown in FIG. 6. The low nibble indicates that there are two outputs to be opened. Referring to these, bytes 205 and 206 refer to the first output and specifically the two "ones" in byte 205 refer to valve 4. The information in byte 206 indicates "24 minutes" (byte 206 indicates 180 units of 8 seconds: 1440=4 minutes).

The next two following bytes 207 and 208 refer to the second output indicating the output number is 9 and that the time for opening is 1440 units of 8 seconds (11520=184 minutes).

N.B. When the time to open is 0, this means "close output", when the time to be opened is FFF this means "open until receiving a close command".

Following the bytes of FIG. 9, come the ten bytes of FIG. 10, these represent the downloading of input data and need not be described further.

Following the ten bytes of FIG. 10, there will appear two bytes of CRC, because the total number of bytes in the frame is greater than 16.

For a further example, the slave may answer as shown in FIG. 11.

FIG. 11 shows the link layer of the slave's response. The first byte 300 indicates the slave address. The second byte 301 has the expansion bit set to 0, indicating that there is no expansion byte. The originate bit indicates a 0, showing that this is an answer. The next two following bits show the frame sequence being 1 (the answer to frame sequence 1). The answer shown in FIG. 11 indicates "OK". This is explained as follows.

Because there is no type information, only the link layer itself exists followed by a CRC (not shown), this means a positive acknowledgement on the frame sequence. The two bytes 300 and 301 are followed by a single CRC byte.

If the protocol length is 4 bytes (for example ACK with expansion address), a further single byte is added to it. This prevents collision with frames from an INTRAC (trademark) system on the same bus. A suitable byte is shown in FIG. 12. This is a diagnostic with diagnostic type 0 as null word.

We claim:

1. A method of communications between a master unit and a slave unit of a supervisory control and data acquisition system comprising the steps of:

sending at least two bytes of data from the master unit to the slave unit, where the first byte is an address byte containing address information for addressing the slave unit and the second byte is a control byte containing an expansion bit and two address/type variable bits to be interpreted by the slave according to the following rule set;

if an expansion bit of the control byte is set, then a third byte is to be expected containing address information for addressing the slave unit and the two variable bits contain type information;

if the expansion bit is not set, then no third byte is to be expected and the variable bits contain address information; and if the variable bits are type information then a first state of these bits indicates a broadcast message and a second state indicates a different message;

receiving the at least two bytes of data;

decoding these bytes;

applying the rule set;

receiving the third byte if required by the rule set;

comparing the address information in the first byte and, selectively, the variable bits and the third byte as required by the rule set with the address of the slave.

2. The method according to claim 1, wherein the first byte comprises 8 bits of slave address and the second byte comprises 1 expansion bit, 2 variable address/type bits and 5 control bits.

3. The method according to claim 1, further comprising the step of transmitting a system address in the first byte and, at all slave units, receiving and decoding the system address and, at all slave units, receiving and decoding the at least two bytes and the immediately following bytes in response to decoding of the system address.

4. The method according to claim 1 further comprising the step of, at all slave units, receiving and decoding the at least two bytes and determining whether the expansion bit is set and the variable bits are in the first state and, when the expansion bit is not set and the variable bits are in the first state, receiving and decoding, at all slave units, the immediately following bytes in response said step of determining.

5. The method according to claim 1 further comprising the step of transmitting, from the master unit a complete frame comprising the at least two bytes and optional further bytes and at least one redundancy check byte, wherein two redundancy check bytes are transmitted when the frame equals or exceeds a predetermined number of bytes and one redundancy check byte is transmitted when the frame is shorter than said predetermined number of bytes.

6. A unit of supervisory control and data acquisition communications system having a master unit and a slave unit, comprising:

means for receiving at least two bytes of data from another unit, where the first byte is an address byte containing address information for addressing the receiving unit and the second byte is a control byte containing an expansion bit and two address/type variable bits to be interpreted by the receiving unit according to the following rule set;

if an expansion bit of the control byte is set, then a third byte is to be expected containing address information for addressing the slave unit and the two variable bits contain type information;

if the expansion bit is not set, then no third byte is to be expected and the variable bits contain address information; and if the variable bits are type information then a first state of these bits indicates a broadcast message and a second state indicates a different message;

means for decoding the at least two bytes according to the rule set;

means storing an address unique to the receiving unit and for comparing the address information in the first byte and, selectively, the variable bits and the third byte as required by the rule set with the address.

* * * * *